US006824284B2

(12) United States Patent
Chinniah et al.

(10) Patent No.: US 6,824,284 B2
(45) Date of Patent: Nov. 30, 2004

(54) EDGE-LIT OPTICAL ELEMENT HAVING A MANIFOLD AND LAMP ASSEMBLY UTILIZING SUCH ELEMENT

(75) Inventors: Jeyachandrabose Chinniah, Ann Arbor, MI (US); Balvantrai G. Patel, Jacksonville, FL (US); Edwin M. Sayers, Saline, MI (US); Jeffrey A. Erion, Plymouth, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 67 days.

(21) Appl. No.: 10/180,433

(22) Filed: Jun. 25, 2002

(65) Prior Publication Data

US 2003/0235046 A1 Dec. 25, 2003

(51) Int. Cl.[7] ................................................ G01D 11/28

(52) U.S. Cl. .......................... 362/27; 362/31; 362/511; 362/330; 362/339; 359/834; 359/837

(58) Field of Search ............................. 362/23, 26, 27, 362/31, 551, 555, 459, 487, 509, 511, 540, 543, 544, 545, 227, 235, 236, 800, 339, 317, 326, 327, 330; 359/831, 833, 834, 837; 385/129, 147

(56) References Cited

U.S. PATENT DOCUMENTS

| | | | | | |
|---|---|---|---|---|---|
| 2,900,949 | A | * | 8/1959 | Baker | 362/26 |
| 3,561,145 | A | * | 2/1971 | Shotwell | 362/26 |
| 3,828,182 | A | | 8/1974 | Semonovich | 362/121 |
| 4,257,084 | A | * | 3/1981 | Reynolds | 362/31 |
| 4,929,866 | A | * | 5/1990 | Murata et al. | 362/235 |
| 5,165,772 | A | * | 11/1992 | Wu | 362/26 |
| 5,202,950 | A | | 4/1993 | Arego et al. | 385/146 |
| 5,590,945 | A | * | 1/1997 | Simms | 362/31 |
| 5,700,078 | A | | 12/1997 | Fohl et al. | 362/553 |
| 5,771,326 | A | | 6/1998 | Fohl et al. | 385/123 |
| 5,791,757 | A | | 8/1998 | O'Neil et al. | 362/556 |
| 5,796,904 | A | | 8/1998 | Marinelli et al. | 385/123 |
| 5,857,770 | A | | 1/1999 | Fohl et al. | 362/511 |
| 5,890,796 | A | | 4/1999 | Marinelli et al. | 362/307 |
| 6,036,340 | A | | 3/2000 | Fohl et al. | 362/511 |
| 6,192,824 | B1 | | 2/2001 | Chang | 116/173 |
| 6,196,691 | B1 | | 3/2001 | Ochiai | 362/31 |
| 6,217,185 | B1 | | 4/2001 | Feger et al. | 362/31 |
| 6,293,683 | B1 | | 9/2001 | Okada | 362/31 |
| 6,305,813 | B1 | * | 10/2001 | Lekson et al. | |
| 6,443,582 | B1 | * | 9/2002 | Tarne et al. | 362/555 |

FOREIGN PATENT DOCUMENTS

| | | |
|---|---|---|
| EP | 0 940 625 A2 | 9/1999 |
| EP | 1 022 510 A2 | 7/2000 |

* cited by examiner

*Primary Examiner*—John Anthony Ward
*Assistant Examiner*—Ismael Negron
(74) *Attorney, Agent, or Firm*—Brinks Hofer Gilson & Lione

(57) ABSTRACT

A lamp assembly including a number of light sources each utilized in conjunction with an optical element. The optical elements include a body of light transmitting material which further includes a top surface, a bottom surface, a front surface and a plurality of facets. The facets receive light through the front surface and reflect light through the top surface. The assembly further includes a manifold defined by the optical elements. When viewed in a direction toward the top surface, a majority of the optical elements have a common shape, preferably a pie wedge shape.

36 Claims, 4 Drawing Sheets

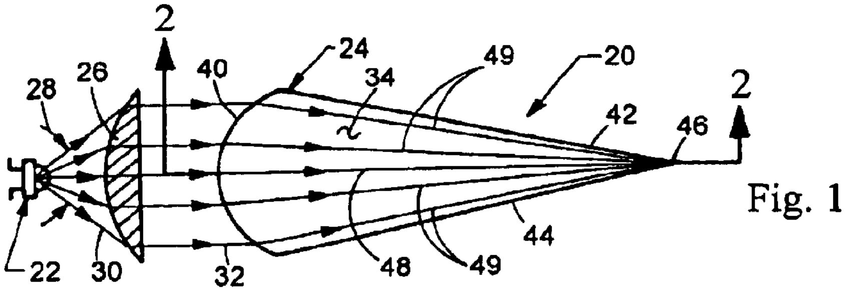
Fig. 1
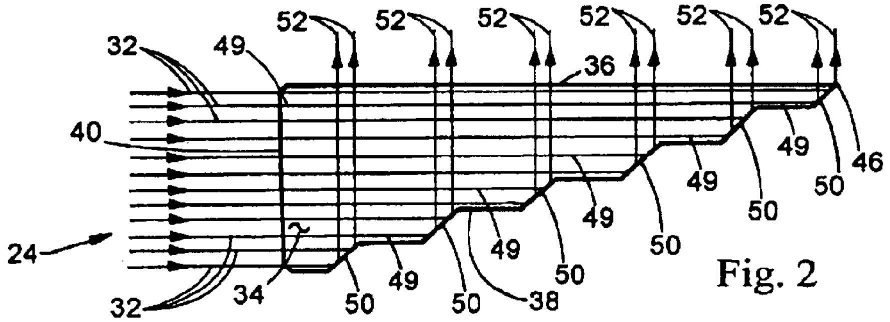
Fig. 2
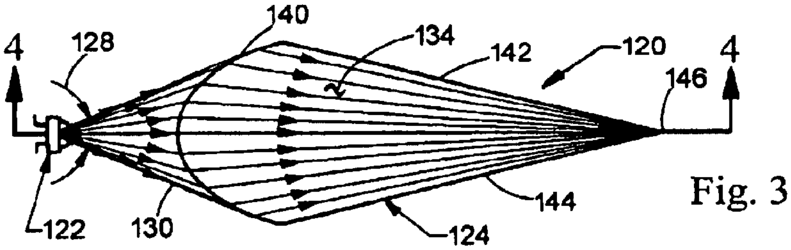
Fig. 3
Fig. 4
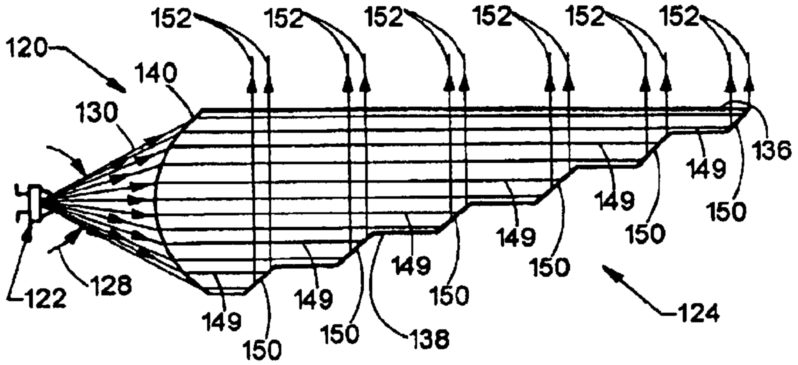

EDGE-LIT OPTICAL ELEMENT HAVING A MANIFOLD AND LAMP ASSEMBLY UTILIZING SUCH ELEMENT

BACKGROUND OF THE INVENTION

1. Field of the Invention

The present invention relates to lighting systems and, more specifically, to an optical element and a lamp assembly using the same. The assembly according to the present invention will find utility in vehicle lighting systems, as well as in a variety of non-automotive illumination applications.

2. Description of the Related Art

Conventional automotive lighting systems, such as head lamps, tail lamps, signal lamps and interior lamps, typically are constructed as bulb and reflector systems. In such a system, the filament of the bulb emits the light utilized by the system and the filament is located at or near a focal point of a parabolic reflector. The light is collected by the reflector and reflected in the desired direction as a light beam. If necessary, a lens is used to shape the light beam into the specific pattern required by the particular application of the lighting system itself.

While widespread in use, bulb and reflector systems are well known as having various disadvantages. One such disadvantage is the longevity of the filament in the bulb. This useful life is approximately one third that of other light sources, such as LED light sources. Another disadvantage of a filament bulb and reflector system is that only about 30% of the light emitted from the bulb's filament is converted into useful light. Yet another disadvantage is that bulb and reflector systems have significant packaging requirements (having a sizable depth measured along its focal axis and a height/width measured in directions perpendicular to the focal axis) thereby limiting exterior aerodynamics, aesthetic styling and engine bay space. Finally, the energy consumption of reflector system is relatively high with a significant amount of the energy being consumed as thermal radiation, not emitted as useful light. In view of the amount of thermal radiation emitted by bulbs and reflector systems, design and construction of the reflector and associated housing materials become important factors and can significantly affect the cost of the overall system.

In an effort to move away from bulb and reflector lighting systems, various other approaches have been proposed. One such approach utilizes a fiberoptic light guide which transmits light from a remote source to a reflector. Problems with these systems include the further use of reflectors in combination with a high intensity discharge source. Limitations also exist on the light guides relating to transmission capacity and the degrading effects of environmental factors.

Another system proposed as an alternative to the bulb and reflector systems is one where a laser operates as the light source. While some of these systems appear promising, problems include variation in illumination intensity across the width of the laser light beam, as well as designing criteria so as to avoid the formation of hot spots when the laser light beam is transmitted.

In view of the above and other limitations on the known technologies, it is apparent that there exists a need for an improved lighting system which overcomes the various and other disadvantages of the above and other lighting systems.

SUMMARY OF THE INVENTION

The present invention achieves the above and other objectives by providing a lamp assembly that includes a plurality of light sources utilized in conjunction, preferably, with an equal plurality of optical elements. The optical elements themselves may be formed into a light transmitting manifold. Each optical element includes a top surface, a bottom surface, sides, and a plurality of facets. The facets are oriented to receive light from the light sources through the front surface and reflect light through the top surface. The manifold includes a composite top surface, a composite bottom surface and a composite perimeter surface, respectively defined by the top surfaces, bottom surfaces and front surfaces of the optical elements. Preferably the facets are formed in the bottom surface and, in order to shape the light transmitted from the manifold, an optic component may be provided on the top surface and/or the bottom surface of the optical elements.

While the manifold is preferably manufactured with a unitary construction, with each optical element identifiable as a portion thereof, the manifold may also be formed by orienting discrete optical elements relative to one another and attaching the optical elements to one another along their sides or other areas. Attachment may be by bonding or other means.

In one preferred embodiment, substantially all of the optical elements have a common shape. Preferably, the common shape is a pie wedge shape. In another embodiment, the common shape is a bar shape. The pie wedge shape may be such that the sides utilized in defining the pie wedge shape are of equal length. In another alternative embodiment, the sides are of an unequal length.

In another aspect, the invention may be seen as a manifold defined by a plurality of optical elements. The manifold may be unitarily formed or formed out of discrete optical elements joined together with one another by various means. The optical elements themselves include a top surface, a bottom surface, a front surface and sides. The optical elements are additionally provided with reflective facets that are oriented such that they receive light through the front surface and reflect light through the top surface of the optical element. As is seen from the detailed discussion that follows, a plurality of reflective facets are provided in each optical element. Preferably, the reflective facets are provided in the bottom surface of the optical element. When provided with a plurality of reflective facets in the bottom surfaces of the optical elements, the bottom surfaces can generally be viewed as having a stepped construction.

In a preferred construction, the optical elements defining the manifold exhibit a common shape. The shape, when viewed in the direction toward the top surface, is a pie wedge (tapered) shape. The sides of the pie wedge shape may be equal in length, thereby giving the pie wedge shape an equilateral construction or, alternatively, the sides may be unequal in length.

If desired, optic components can be provided on the top surface and/or bottom surface of the optical elements to shape the light being emitted from the optical element. When provided on the bottom surface, the optic components may replace one or more of the reflective facets.

In a further aspect, the present invention can be viewed solely as a light transmitting optical element having the characteristics and features described above in connection with the manifold.

Additional objects, advantages and features of the present invention will be readily appreciated by those skilled in the art upon review of the following detailed description, taken in conjunction with the drawings and the appended claims.

BRIEF DESCRIPTION OF THE DRAWINGS

FIG. 1 is a top plan view of an optical element according to the principals of the present invention and illustrated in conjunction with a light source;

FIG. 2 is a sectional view of the optical element seen in FIG. 1 taken generally along line 2—2 therein;

FIG. 3 is a top plan view of a further optical element illustrated in conjunction with a light source;

FIG. 4 is a cross sectional view of the optical element seen in FIG. 3 and taken generally along line 4—4 therein;

DETAILED DESCRIPTION OF THE PREFERRED EMBODIMENTS

Figure 5:
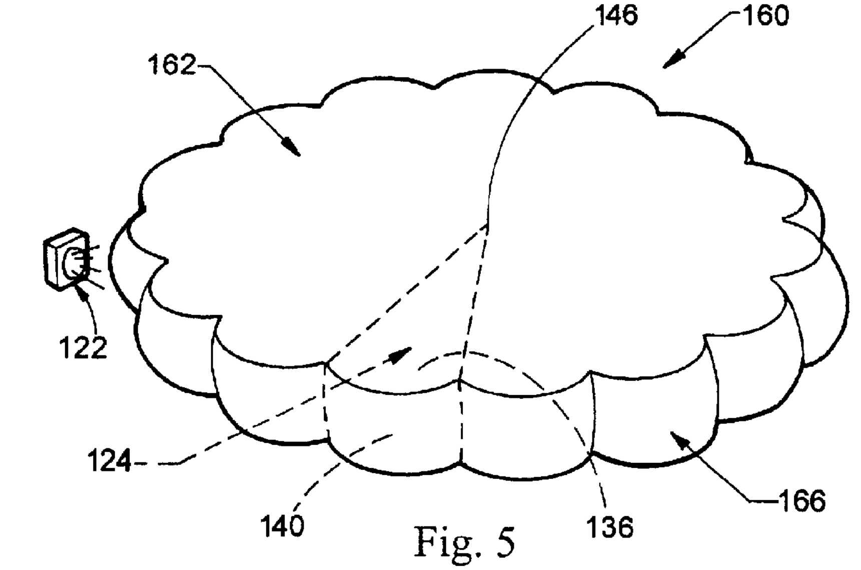
FIG. 5 is a top perspective view of a manifold utilizing a plurality of optical elements.

The present invention discloses an optical element construction enabling an efficient construction of lamps assemblies utilizing LED light sources. The LED light sources are used in conjunction with a light transmitting manifold made up of an arrangement of optical elements having shapes allowing for their incorporation into the overall manifold construction. Alone or in combination, the optical elements, manifolds and lamp assemblies of the present invention provide a compact package construction, in addition to reduced power consumption. While the present invention will have particular use in automotive applications (such as headlamps, tail lamps, single lamps and interior lamps), it will be readily apparent that many non-automotive applications exist for the invention as well. Such applications include home lighting and commercial lighting applications.

Referring now to the drawings, seen in FIG. 1, a lamp assembly 20 according to the present invention has, as its principal components, as a light source 22 and an optical element 24. In the particular embodiment of FIG. 1, a collimating external lens 26 is located between the light source 22 and the optical element 24.

The light source is a common LED light source that emits the majority of its light flux within a cone defined within a total included angle of $2\phi°$. This $2\phi$ angle is designated at 28 in FIG. 1. The relative luminous intensity as defined by the bell curve distribution graph, may be near 100% of the emitted light where $\phi$ is equal to slightly greater than 50°. Clearly, LED's having light flux cones defined by a greater or lesser 2 included angle could be utilized in the present invention.

In the embodiment of FIG. 1, the light emitted from the light source 22, within angle 28, interacts with the collimating external lens 26 such that the light rays, designated at 30, forming the lateral boundaries of the $2\phi$ angle 28 or cone pass through the external lens 26 and redirected, in conjunction with other light rays, so as to be collimated or near collimated light rays 32. As such, the specific size and shape of the collimating external lens 26 will be dictated by the appropriate $2\phi$ angle 28 of the light source 22 and the relative distance from the light source at which the external lens 26 is positioned. Collimated light rays 32 are directed from the external lens towards the optical element 24.

The optical element 24 is defined as a body 34 of light transmitting material. One preferred material for the optical element includes acrylic, although other materials such as polycarbonate and glass could also be utilized. The body 34 includes a top surface 36, a bottom surface 38, a front surface 40 and at least two side surfaces 42 and 44. The top and bottom surfaces 36, 38 of the body 34 are more readily seen in FIG. 2.

As further seen in FIG. 1, when viewed in a direction towards the top surface 36, the body 34 is provided with a generally pie wedge shape with the front surface 40 being opposed from the point or apex 46 of the pie wedge shape. From FIG. 1 it is also seen that the pie wedge shape is equilateral in its construction. As used herein, equilateral means that the lengths of the side surfaces 42 and 44 are equal and that the apex 46 is located along a center line by ray 48 extending through the front surface 40 and the apex 46. In this embodiment, the front surface 40 is of an elliptic cylinder.

When considered from the perspective shown in FIG. 1, (a top perspective) as the collimated light rays 32 engage and are transmitted through the front surface 40 of the optical element 24, the light rays 48, 49 are directed by the front surface 40 toward the apex 46. From the side perspective of FIG. 2, it is seen that the rays 49 remain collimated (or near collimated for finite source) and are transmitted through the body 34 in the direction of the apex 46. Progressively the rays 49 will engage the bottom surface 38 of the body 34 because of its stepped shape.

As mentioned above, the shape of the bottom surface 38 may be described as stepped or provided with a series of facets 50. The facets 50 are oriented or angled with respect to the rays 49 traveling within the body 34 such that the facets reflect the rays 49 toward the top surface 36 by total internal reflection. Rays 52 reflected toward the top surface are designated in FIG. 2 as rays 52. As further seen in FIG. 2, the rays 52 are transmitted substantially perpendicular to the top surface 36 and are emitted out of the body 34 through this surface toward the intended object of illumination. While illustrated as being reflected in a direction substantially perpendicular to the top surface 36, the rays 52 could alternatively be reflected by the facets 50 in a non-orthogonal direction toward the top surface 36. Such a reflection, however, may reduce the efficiency of the optical element 24 and such aspects would need to be accounted for in the design criteria to insure transmission through the top surface.

As seen in FIG. 3, a second lamp assembly 120 is provided, differing from the previously discussed embodiment in that the need for the collimating external lens 26 has been eliminated. In this embodiment, the light source 122 emits light rays 130 within a the body $2\phi$ angle 128 and directly at a front surface 140 of an optical element 124. The front surface 140 of the optical element 124 is specifically shaped such that the light rays 130 from the light source 122 are convergingly redirected (top perspective) toward an apex 146 of the body 134 and collimated or nearly collimated (side perspective).

Similarly, the embodiment of FIG. 1, the body 134 in FIG. 2 includes a top surface 136, a bottom surface 138, side surfaces 142 and 144, in addition to the front surface 140 and the apex 146 mentioned above. The front surface 140 is preferably an elliptic/spherical hyperboid. However, such shapes restrict the focal length and place limitations on the location of the center of the pie wedge shape and on the refractive index of the material being used. Instead of such a standard shape, it is preferred that a numerically generated, preformed surface is used to optimize the light collecting efficiency, without the restrictions imposed by standard shapes. For a given source distance S from the light source to the front surface and for the distance R from the front surface to the apex of the optical element, it is known that the front surface form can be calculated, as a preformed surface for any specific size and for a given refractive index "n" of the material forming the optical element. Also similar to the optical element 24 described above, the bottom surface 138 of optical element 124 is provided with a plurality of facets 150. The orientation or angular position of the facets 150 is such that upon impingement of the bottom surface 138 at each facet 150, a light ray 149 being transmitted through the body 134 is redirected by total internal reflection toward the top surface 136.

While a light source 22, 122 in combination with an optical element 24, 124 may be utilized as a lamp assembly 20, 120, it is anticipated that greater application of these elements will be seen through the incorporation of multiple light sources each in conjunction with an optical element, the optical elements being arranged to form a light transmitting manifold or structure. One such manifold is illustrated in FIGS. 5 and 6 and designated at 160.

Figure 6:
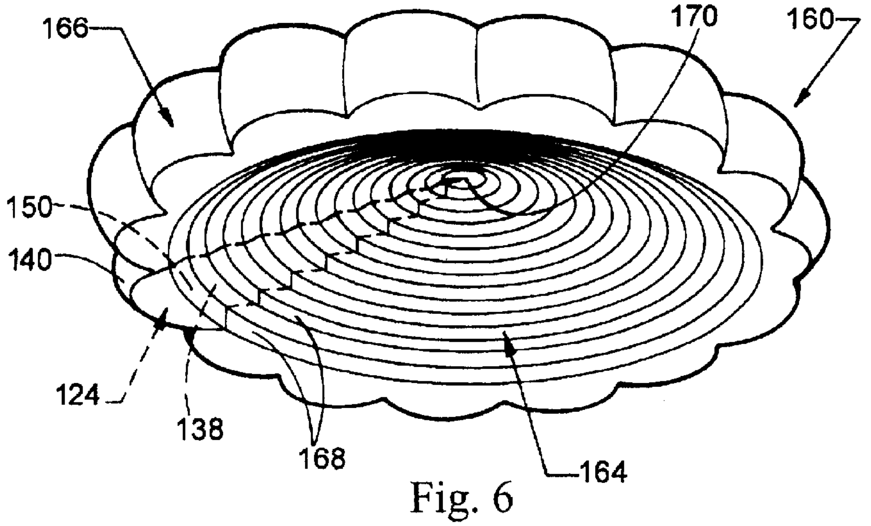
FIG. 6 is a bottom perspective view of the manifold illustrated in FIG. 6.

As seen in FIGS. 5 and 6, the manifold 160 is an assemblage of 15 pie wedge shaped optical elements 124 (designated in phantom). Positioning each optical element 124 such that a side surface 142 of one optical element 124 is adjacent to a side surface 144 of the immediately adjacent optical element 124, produces the manifold 160 with a generally circular disk-shape. Constructed as such, the manifold 160 includes a flat composite top surface 162, a composite bottom surface 184 and a perimeter surface 166. The composite top surface 162 is thereby defined by top surfaces 138 of the optical elements 124. Similarly, the composite bottom surface 164 is defined by bottom surfaces 138 and the composite perimeter surface 166 is defined by the front surfaces 140 of the optical elements 124. The composite bottom surface 164 additionally includes composite facets 168 defined by facets 150 of each optical element 124. The composite facets 168 are illustrated as being annular (although other shapes may be used) and are concentrically located with respect to one another, thus defining a generally stepped structure for the composite bottom surface 164 progressing from adjacent to the perimeter surface 166 towards a manifold center 170, defined by apexes 146 of the optical elements 124.

While described as an arrangement of discrete components, the manifold 160 is preferably constructed as a unitary body with each optical element 124 being individually identifiable, but not separable, within the overall construction. Construction techniques include injection molding, casting, glass forming and other techniques. Alternatively, the manifold 160 can be formed from discrete optical elements 124 connected to one another. With this construction, each optical element 124 is positioned and attached to the adjacent optical element along the side surfaces 142 and 144 mentioned above. Common methods of joining may be used in securing optical elements 124 together, including adhesive, sonic, thermal, or friction bonding or fusing of the side surfaces 142 and 144 together.

Other arrangements of the optical elements 24, 124 into light transmitting manifolds or portions are possible. While no attempt has been made to define all potential configurations and arrangements, several representative examples are presented in FIGS. 7, 8 and 9.

Figure 7:
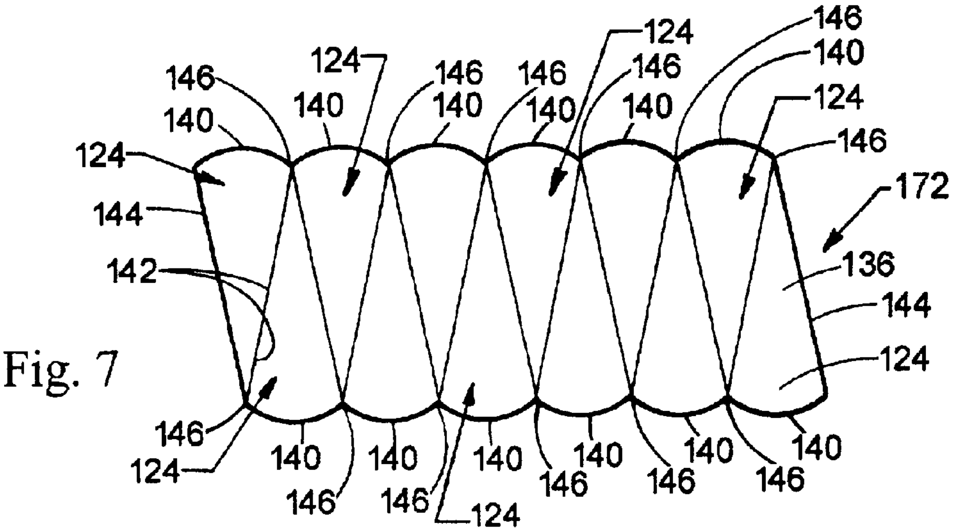
FIG. 7 is an arrangement of alternatingly oriented optical elements similar to those seen in FIG. 3.

As seen in FIG. 7, an arrangement 172 includes optical elements (hereinafter just referenced as "optical elements 124") positioned in an alternating configuration where the side surface 142 of one optical element 24 is located adjacent to the side surface 142 of an immediately adjacent or second optical element 124, while the side surface 144 lies immediately adjacent to the side surface 144 of another or third optical element 124. Obviously, the optical elements 124 forming the ends of the arrangement 172 are not adjacent to another optical element 124. This provides the overall structure with a generally strip-like configuration, its lateral sides being defined by the adjacent front surfaces 40 of the optical elements 124. In use, light sources 22 would be located along the lateral sides in conjunction with each front surface 40.

Figure 8:
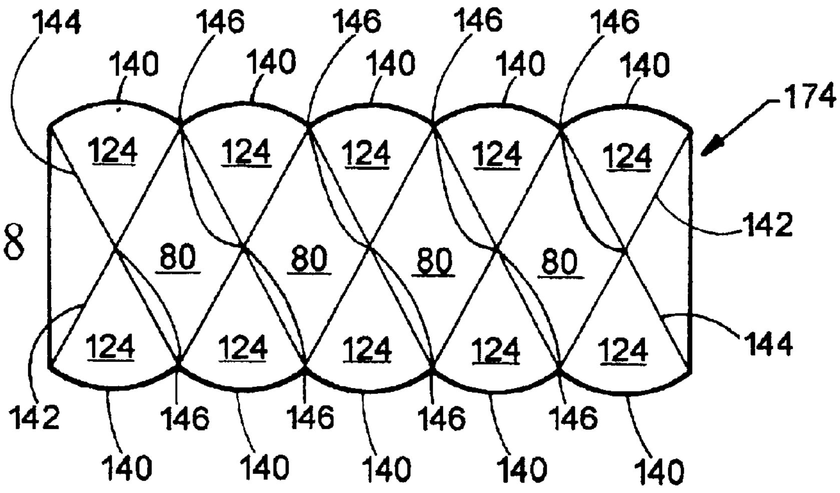
FIG. 8 is a further arrangement of optical elements.

In an arrangement 174 of FIG. 8, optical elements 124 are positioned directly opposite one another in an apex-to-apex configuration. Laterally adjacent optical elements 124 accordingly meet at the opposite lateral edges of their respective front surfaces 40. Between each group of four optical elements a gap 180 is provided. The gap 180 may be an actual physical void or may be a space not defined by a portion of an optical element 24, but otherwise occupied by material.

Figure 9:
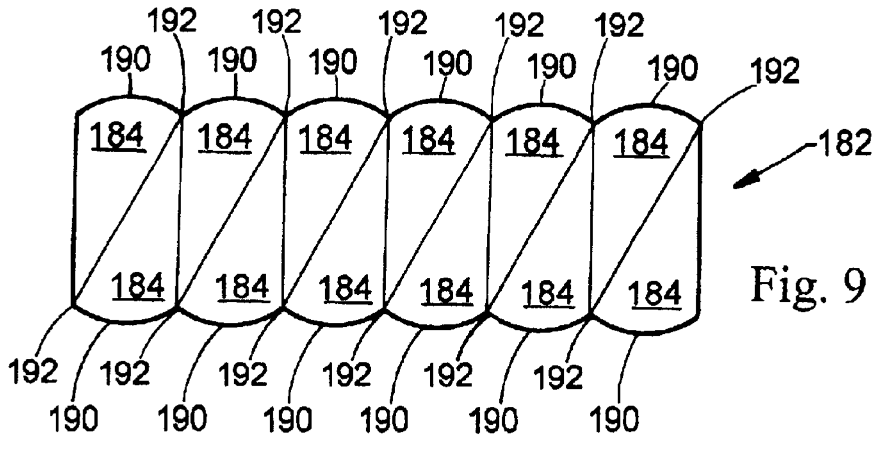
FIG. 9 is yet another arrangement of optical elements, the elements therein having one end of the element offset relative to the other end of the element.

A further arrangement 182 of optical elements is illustrated in FIG. 9. The optical elements in this arrangement 182 are identified at 184. As seen in this Figure, the optical elements 184 are not of the equilateral construction described above. Rather, the optical elements 184 are provided with a left side surface 186 and a right side surface 188 of differing lengths. In such an optical element 184, light rays being transmitted through the optical element 184 are directed by a front surface 190 convergingly toward an apex 192 and collimated or nearly collimated (with regard to the height of the optical element 184).

In order to shape the light beams being emitted from the respective top surfaces 36, 136, 162, 194, integrated beam shaping optic components may be formed in the top surfaces. These components (pillows, flutes, prisms, etc.) may be unitarily formed with the top surface or may be provided as a separate lens surface independent of the top surfaces.

Figure 10:
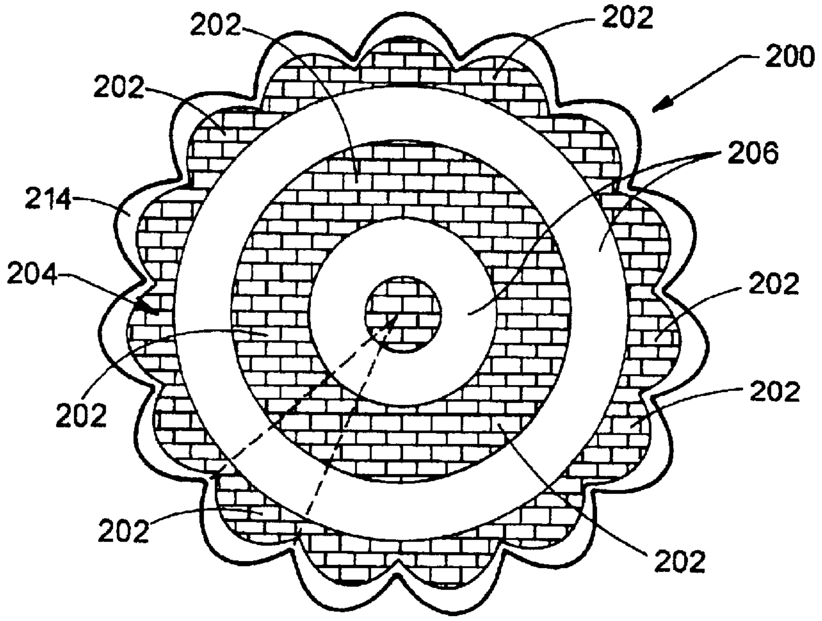
FIG. 10 is a top plan view of a manifold, similar to that seen in FIG. 5, with alternate rings of optic and reflective elements formed on its top surface.

In the manifold 200 of FIG. 10, a representative number of the optic components being identified at 202 and the optic components are provided over a composite top surface 204, the optic components except for areas defined by two angular rings 206 which are otherwise flat portions of the top surface 204. Thus, the optic components 202 need not cover the entire top surface 204.

Figure 11:
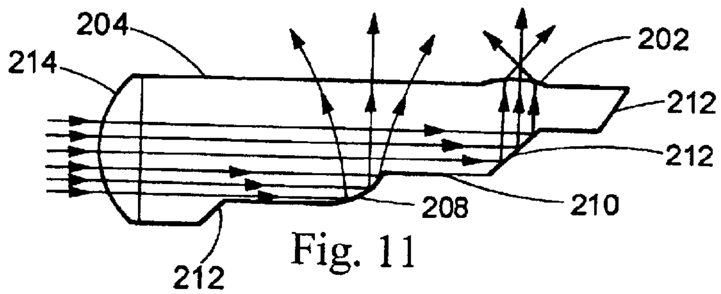
FIG. 11 is an enlarged sectional view through an optical element incorporating the lens element into surfaces of the element.
Figure 12:
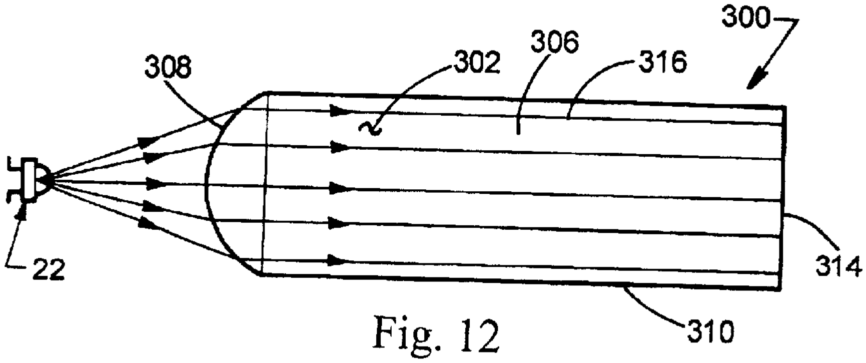
FIG. 12 is a top plan view of yet another optical element.

Alternatively, and as seen in FIG. 11, optic components 208 can be integrated into the bottom surface 210, replacing one or more facets 212 formed therein. In doing so, consideration must be given to avoid light losses as a result of violations of the total internal reflection principal (the angle of instance of the light rays falling on the beam forming optic surfaces has to be greater than the critical angle that is based on the refractive index of the material forming the optic component). For convenience in the cross sectional view of FIG. 12, only one top surface optic component 202 and only one bottom surface optic component 208 are illustrated, it being understood that additional optic components could readily be provided on the top and bottom surfaces 204, 210.

Finally, it is noted that the construction of arrangements and manifolds need not necessarily be limited to the utilization of pie wedge shaped optical elements. Generally bar shaped optical elements are also envisioned hereby and generally illustrated in FIG. 12 at 300. As with the prior embodiments, the optical element 300 is defined by a body 302, a top surface 304, a bottom surface 306, a front surface 308, side surfaces 310 and 312, as well as an end surface 314. Light rays transmitted through the body 302 would be collimated (or nearly collimated for finite light sources) in a perspectives and would be directed by facets (not shown), provided on the bottom surface generally parallel to the end surface 314, up through the top surface 304.

While the above description constitutes the preferred and contemplated embodiment of the present invention, it will be appreciated that the invention is susceptible to modification, variation and change without departing from the fair scope and true meaning of the invention and the accompanying claims.

We claim:

1. A lamp assembly for use in an automotive vehicle, said lamp assembly comprising:

a light source adapted to generate light;

a plurality of optical elements, said optical elements each having a body of light transmitting material, an element top surface, an element bottom surface, an element front surface and a plurality of reflective facets formed in said body, a majority of said optical elements having a generally pie wedge shape when viewed in a direction toward said element top surface;

a manifold adapted to transmit light, said manifold including said plurality of optical elements arranged with respect to one another, said manifold having a composite top surface, a composite bottom surface and a composite perimeter surface; and the element front surface being configured to collimate the light in one direction and focus the light to the corner of the pie wedge shape opposite the element front surface.

2. A lamp assembly according to claim 1, said pie wedge shape having two planar sides of equal length.

3. A lamp assembly according to claim 2 wherein said element front surface is generally outwardly convex.

4. A lamp assembly according to claim 1, said pie wedge shape, having two planar sides of unequal length.

5. A lamp assembly according to claim 1 wherein said manifold is unitarily formed.

6. A lamp assembly according to claim 1 wherein said light source is located generally opposite one of said element front surfaces and transmits light therethrough.

7. A lamp assembly according to claim 6 wherein substantially all emitted light from said light source is transmitted through said element front surface.

8. A lamp assembly according to claim 6 wherein a majority of light emitted from said light source is transmitted through said element front surface.

9. A lamp assembly according to claim 1 further comprising an optic component on said top surface.

10. A lamp assembly according to claim 1 wherein said facets are formed in said bottom surface.

11. A lamp assembly according to claim 10 further comprising an optic component on said bottom surface.

12. A lamp assembly according to claim 1 further comprising an optic component on said bottom surface.

13. A lamp assembly according to claim 1 wherein said manifold is generally circular in shape.

14. A lamp assembly according to claim 1 wherein said manifold is generally of a strip shape.

15. A manifold for transmitting light comprising:

a plurality of optical elements arranged with respect to one another so as to define said manifold, each of said optical elements including a element top surface, an element bottom surface, an element front surface and element side surfaces, each of said optical elements further including a reflective facet, said reflective facet being oriented to receive light transmitted through said element front surface and to reflect light through said element top surface, said top element surfaces of each of said optical elements cooperating to define a composite top surface of said manifold, said bottom surfaces of each of said optical elements cooperating to define a composite bottom surface of said manifold, said element front surfaces of each of said optical elements cooperating to define a composite perimeter surface of said manifold, said reflective facets of each of said optical elements cooperating to define a composite face of said manifold;

wherein said optical elements have a generally pie wedge shape, the element front surface being configured to collimate the light in one direction and focus the light to the corner of the pie wedge shape opposite the element front surface.

16. A manifold according to claim 15 wherein said pie wedge shape includes two planar sides of equal length.

17. A manifold according to claim 15 wherein said pie wedge shape includes two planar sides of unequal length.

18. A manifold according to claim 15 wherein said pie wedge shape is defined by said element front surface and said element side surfaces.

19. A manifold according to claim 15 wherein said reflective facets are formed in said element bottom surface.

20. A manifold according to claim 19 wherein said optic component is formed on said element bottom surface.

21. A manifold according to claim 15 further comprising an optic component formed in at least one of said optical elements.

22. A manifold according to claim 21 wherein said optic component is formed on said element top surface.

23. A manifold according to claim 22 wherein a second optic component is formed on said element bottom surface.

24. A manifold according to claim 15 wherein said manifold is unitarily formed.

25. A manifold according to claim 15 wherein said manifold is generally circular in shape.

26. A manifold according to claim 15 wherein said manifold is generally of a strip shape.

27. A light transmitting optical element comprising:

a body having a top surface, a bottom surface, a front surface, at least two side surfaces, and a reflective facet, said facet being oriented to receive light through said front surface and reflect light through said top surface; and the body having a generally pie wedge shape, the front surface being configured to collimate the light in one direction and focus the light to the corner of the pie wedge shape opposite the front surface.

28. A light transmitting optical element according to claim 27 wherein said facet is formed on said bottom surface.

29. A light transmitting optical element according to claim 27 wherein said side surfaces are of equal length.

30. A light transmitting optical element according to claim 27 wherein said side surfaces are of unequal length.

31. A light transmitting optical element according to claim 27 wherein said pie wedge shape is defined by said front surface and said side surfaces.

32. A light transmitting optical element according to claim 27 wherein said front surface is outwardly convex.

33. A light transmitting optical element according to claim 27 further comprising an optic component adapted to shape light being emitted from said top surface.

34. A light transmitting optical element according to claim 33 wherein said optic component is formed in said top surface.

35. A light transmitting optical element according to claim 34 wherein a second optic component is formed in said bottom surface.

36. A light transmitting optical element according to claim 33 wherein said optic component is formed in said bottom surface.

* * * * *